2,887,451
SEPARATION PROCESS USING FLY ASH

James H. Hill, Richmond, and William C. Moser, Stratford Hills, Va., assignors to E. I. du Pont de Nemours & Company, Wilmington, Del., a corporation of Delaware No Drawing. Application March 19, 1954
Serial No. 417,512

4 Claims. (Cl. 210—40)

This invention relates to separation of organic substances from aqueous media; it concerns particularly purification of alkali liquor resulting during manufacture of regenerated cellulose by the viscose process.

In preparing viscose solution, a manufacturer of rayon or cellophane first steeps cellulosic material, which may be wood-pulp sheets or cotton linters, in aqueous alkali to form so-called "alkali cellulose." Upon completion of the steeping, pressing removes excess solution from the treated material so that the pressed weight is no more than about three times the original weight. Steeping dilutes the alkali to about eighty to ninety percent of the original concentration. In addition, the expressed liquor contains substances leached from the original cellulosic material, primarily carbohydrates of low molecular weight, many of which are denoted by the general term "hemicellulose."

Economy of operation requires recycling of unconsumed alkali, but merely bucking up the solution to its original alkaline concentration is insufficient; the added organic impurities must be removed to ensure satisfactory steeping. Prominent among processes employed to accomplish this purification are dialysis and electrolysis. However, the voluminous waste liquor from each of these processes contains appreciable hemicellulose and alkali, often about two percent of each, by weight. This waste liquor continues to represent a potential pollution hazard to natural waters (in which it customarily is dumped). In particular, the waste organic substances may lower the concentration of dissolved oxygen below the minimum, with consequent deleterious effect upon fish and other aquatic life. An alternative to disposal in water is disposal in air by first evaporating substantially all the water to concentrate the organic contaminants and then burning the residue, but this method is too expensive here, inasmuch as the amount concentrated and burned may reach fifteen pounds for each hundred pounds of regenerated cellulosic product. Governmental regulation of waste disposal is becoming increasingly strict so that economical methods of rendering wastes safe are essential to continue business operation.

A primary object of the present invention is economical separation of organic contaminants from aqueous media into which they have been introduced from cellulosic materials. Another object is utilization of a readily available by-product of industrial operations to render innocuous the waste alkali liquor from the viscose process. A specific object of this invention is removal of carbohydrates from alkali liquors by treatment with fly ash. Other objects will be apparent from the following description of the invention.

Fly ash is produced when coal burns, particularly on a large scale, as in industrial power or heating plants; it is a mixture of solids, including flue dust as well as unburned or partially burned organic residues from the coal. Often present in it are oxides of such elements as iron, silicon, aluminum, calcium, and magnesium. Fly ash is used conventionally as a constituent of cinder block and as fill for land. In general, the objects of this invention may be attained by bringing fly ash into contact with the aqueous medium from which the organic contaminants are to be separated. An example of this procedure, as it has been applied to waste liquor from viscose manufacture, follows. Percentages are by weight.

Example

After being used to steep wood-pulp sheets an alkali liquor is found to have had its sodium hydroxide content reduced from 18% to 16% and to have acquired 2.5% organic contaminants. The liquor is dialyzed by passage through a series of cells containing membranes readily permeable to the alkali but not to the organic substances, many of which are colloidal in nature, with simultaneous counter-current flow of water. The solution recovered from the solvent cells has an alkali concentration of about 8% and a greatly reduced organic concentration of about 0.2%. The waste retained by the membranes contains 2.1% alkali and 1.8% organic matter. At a rate of about five gallons per minute this waste is added to a settling bed about 10 feet deep over an area of about 3000 square feet. The bed consists of about 500 tons of fairly fine fly ash (60 to 325 mesh) having the following combustion analysis: 56% C, 23% $SiO_2$, 8% $Fe_2O_3$, 4% $Al_2O_3$, and slightly less than 1% alkaline earth residues. After 12 days, seepage from this bed contains about 2% alkali and less than 0.4% organic matter. This fourfold or greater reduction in organic matter renders the treated liquor disposable safely in a much smaller volume of water than could accommodate the liquor without passage through the fly ash.

The economy of the process of this invention is readily apparent. The results accomplished are extremely satisfactory. The fact that not until now has anyone used so ubiquitous a material as fly ash to render viscose wastes more readily disposable is surprising, the more so because of the admitted need for a suitable disposal process. The fly ash, which apparently adsorbs most of the organic substances from the waste liquor, remains suitable for further use in conventional fashion such as mentioned above. Of course, the size of fly ash bed will be selected commensurate with the magnitude of the particular disposal problem in each individual application of the present invention.

What is claimed:

1. Process of treating waste alkali liquor from the viscose process comprising contacting the liquor with fly ash comprising at least a major proportion of carbon.

2. A process comprising contacting an aqueous medium, containing hemicellulose, with fly ash comprising at least a major proportion of carbon and separating the treated aqueous medium from the fly ash.

3. A process comprising contacting an aqueous alkaline medium, containing organic impurities acquired from cellulosic material by contact with the alkaline medium, with fly ash comprising at least a major proportion of carbon and separating the treated aqueous medium from the fly ash.

4. A process comprising contacting with fly ash an aqueous medium containing hemicellulose and separating the treated aqueous medium from the fly ash.

References Cited in the file of this patent

UNITED STATES PATENTS

| | | |
|---|---|---|
| 2,225,024 | Weber | Dec. 14, 1940 |

FOREIGN PATENTS

| | | |
|---|---|---|
| 698,943 | Great Britain | Oct. 28, 1953 |

OTHER REFERENCES

Hopkins: "Water Purification Control," Baltimore; Williams and Wilkins, 1948, pp. 99, 190 and 191.

Davis et al.: "Properties of Cements and Concretes Containing Fly Ash." Report to Research Corp., New York, July 1936, page 5.

Lovett: The Electrochemical Soc., preprint 73-19, May 2, 1938, Columbia Univ., pp. 261-69.

Chem. Abstr., vol. 23, p. 12269, 1929.

Chem. Abstr., vol. 44, pp. 8022$i$ and 8023$a$, 1950.